United States Patent [19]

Oka et al.

[11] Patent Number: 5,472,330
[45] Date of Patent: Dec. 5, 1995

[54] APPARATUS FOR MANUFACTURING A GOLF BALL

[75] Inventors: Kengo Oka, Kobe; Tadahiro Ebisuno, Nishinomiya; Keiji Moriyama; Kazushige Sugimoto, both of Akashi, all of Japan

[73] Assignee: Sumitomo Rubber Industries, Ltd., Japan

[21] Appl. No.: 160,746

[22] Filed: Dec. 3, 1993

[30] Foreign Application Priority Data

Dec. 7, 1992 [JP] Japan .................. 4-326991

[51] Int. Cl.⁶ ............................... B29C 37/02
[52] U.S. Cl. .................. 425/142; 83/914; 264/40.1; 264/161; 264/162; 425/164; 425/289; 425/806; 451/6; 451/379; 451/398
[58] Field of Search .................. 425/806, 806 R, 425/289, 142, 164; 264/161, 162, 40.1; 83/914; 451/5, 6, 24, 379, 398

[56] References Cited

U.S. PATENT DOCUMENTS

| | | | |
|---|---|---|---|
| 1,930,167 | 10/1933 | Goodwin | 264/161 |
| 2,787,024 | 4/1957 | Smith | 264/161 |
| 4,501,715 | 2/1985 | Barfield et al. | 425/806 |
| 4,653,758 | 3/1987 | Solheim | 273/232 |
| 4,894,958 | 1/1990 | Takasaki | 425/806 |

FOREIGN PATENT DOCUMENTS

| | | | |
|---|---|---|---|
| 0295458 | 12/1988 | European Pat. Off. | H25/289 |
| 2011993 | 9/1971 | Germany | 425/806 R |
| 64-8983 | 1/1989 | Japan . | |
| 2194450 | 3/1988 | United Kingdom . | |
| 2200584 | 8/1988 | United Kingdom . | |

*Primary Examiner*—Jay H. Woo
*Assistant Examiner*—Duane S. Smith

[57] ABSTRACT

An apparatus for removing the burr from the seam of a golf ball made using a pair of semispherical molds each having dimple-forming projections on a connecting portion to shape resin into a golf ball having dimples on a seam corresponding to the connecting portion. A ball fixing mechanism holds the golf ball thereto with the seam uncovered. A cutting member having a cutting member, disposed at an end of a rotary shaft, having a radius of curvature smaller than a sectional radius of curvature of each of the dimples. The rotary shaft rotates on its axis and moves forward when the cutting member is brought into contact with each of the dimples on the seam and backward when the cutting member is brought into contact with a convex land thereon. Thereafter, the cutting member is pressed against the seam successively removing the burr while maintaining the integrity of each of the dimples.

11 Claims, 11 Drawing Sheets

APPARATUS FOR MANUFACTURING A GOLF BALL

BACKGROUND OF THE INVENTION

1. Field of the Invention

The present invention relates to an apparatus for manufacturing golf balls and more particularly to an apparatus for removing a burr from a seam of a golf ball with a high accuracy and speed, so that the golf ball has no great circle path which does not necessarily intersect with dimples on the surface thereof.

2. Description of the Related Arts

Generally, resin is shaped into a golf ball by a pair of semispherical molds 1A and 1B as shown in FIG. 12.

That is, a concave surface 3 having dimple-forming projections 2 is formed on each of the molds 1A and 1B. When connecting portions 4 of the molds 1A and 1B are superimposed on each other, the concave surfaces 3 collectively form a cavity. The golf ball is shaped by pressure molding or injection molding of resin into the cavity.

As shown in FIG. 13, in a golf ball 5 formed by using the molds 1A and 1B, a burr 6 is formed on a portion corresponding to the connecting portion 4 of the molds 1A and 1B, namely, a seam 5a.

The burr 6 on the seam 5a is cut off the seam 5a in a subsequent process. But if dimples 8 are formed on the seam 5a, i.e., if the seam 5a is irregular, the burr 6 cannot be cut off the seam 5a. Thus, the dimples 8 cannot be formed on the seam 5a. Hence, dimple-forming projections 2 are not arranged in the vicinity of the connecting portion 4. Accordingly, with the removal of the burr 6 from the golf ball 5 manufactured by using the molds 1A and 1B, a great circle path 9 is formed on the seam 5a as shown in FIG. 14 that does not intersect with dimples 8.

The great circle path 9 badly influences the flight performance of its golf ball and the aerodynamic symmetrical qualities. Therefore, methods for manufacturing the golf ball having no great circle path have been proposed as described below.

In a method as disclosed in Examined Japanese Patent Publication No. 3-81394, convexes 12 and concaves 13 are alternately formed on the connecting portion 11 of molds 10A and 10B as shown in FIG. 15. A seam 14a formed on a golf ball 14 is zigzagged to correspond to the zigzagged configuration of the connecting portion 11 of molds 10A and 10B. In this manner, the great circle path is not formed on the surface of the golf ball 14.

In another method for manufacturing a golf ball having no great circle path thereon, dimples are not formed in the resin-molding process, but by a cutting process to be performed after the resin-molding process. This method is disclosed in Japanese Laid-Open Patent Publication No. 64-8983.

The above-described conventional methods are, however, inappropriate for mass-production of golf balls and incapable of manufacturing them with high accuracy. In fact, golf balls having a great circle path with intersecting dimples are unavailable on the market.

In the method disclosed in Examined Japanese Patent Publication No. 3-81394, it is necessary to shape the connecting portion 11 of the molds 10A and 10B into a complicated configuration. Therefore, it takes considerable time to form the molds 10A and 10B into the above-described configuration, which increases manufacturing costs. In addition, the formation of the molds 10A and 10B leads to variations in size and configuration. Accordingly, it is difficult to shape resin into golf balls having a uniform dimension and configuration using the molds 10A and 10B.

Normally, 280 to 540 dimples are formed on the surface of the golf ball. In the method disclosed in Japanese Laid-Open Patent Publication No. 64-8983, dimples are machined one by one. Therefore, the substantial time and labor required by this method makes it inappropriate for mass-production. In addition, the dimples vary in dimension and configuration.

SUMMARY OF THE INVENTION

It is an object of the present invention to provide an apparatus for accurately and quickly manufacturing a golf ball having no great circle path which does not necessarily intersect with dimples on the surface of the golf ball thereof.

In accomplishing these and other objects of the present invention, there is provided an apparatus for removing a burr formed on a seam of a golf ball, having dimples on the seam, shaped by means of a mold, comprising: a ball fixing mechanisms for fixing the golf ball with a seam exposed; and a cutting section comprising a cutting member, disposed at an end of a rotary shaft, having a radius of curvature smaller than a sectional radius of curvature of the dimple; the rotary shaft rotating on the axis thereof and moving forward when the cutting member is brought into contact with a concave on the seam and backward when the cutting member is brought into contact with a convex land thereon, and a driving mechanism for driving the rotaly shaft. In this construction, the ball fixing mechanism and/or the cutting member rotate, thereby pressing the cutting member against the seam successively.

The term sectional radius of curvature means the radius of curvature of a circular arc formed by the intersection of a plane perpendicular to the axis connecting the poles and the curved surface of the dimple.

There is provided a method for manufacturing a golf ball having no great circle path without dimples, on a seam, comprising the steps of: shaping the golf ball having dimples on the seam corresponding to a connecting portion of each of a pair of semispherical molds having dimple-forming projections on the connecting portion; removing a burr from the seam by rotating a cutting member having a radius of curvature smaller than a sectional radius of curvature of each of the dimples and by moving the cutting member forward when the cutting member is brought into contact with a concave and backward when the cutting member is brought into contact with a convex land. In this manner, the cutting member is pressed against the seam successively removing the burr while maintaining the integrity of the dimples.

More specifically, preferably, the fixing mechanism for retaining the golf ball is rotated on an axis perpendicular to the plane including the seam and passing through the center of the golf ball so as to press the cutting member against the seam successively. It is possible to rotate the rotary shaft of the cutting mechanism around the fixing mechanism so as to press the cutting member against the seam successively.

The burr-removing apparatus according to the present invention is provided with a sensor which detects whether the cutting member contacts a dimple or a convex land on the seam. The rotary shaft of the cutting mechanism is moved forward or backward based on a result detected by the sensor means so that the cutting member is pressed against the seam at almost the same force.

It is possible to use an elastic mechanism comprising such as a helical spring to elastically urge the rotary shaft of the cutting mechanism toward the seam of the golf ball so that the rotary shaft is elastically moved forward when the cutting member is in contact with the dimple and backward when the cutting member is in contact with the land.

Preferably, the ball fixing mechanism comprises upper and lower dies on which a holding concave having a radius of curvature almost equal to that of the golf ball is formed so that the golf ball is sandwiched between the upper and lower dies. Preferably, there are formed, on the holding concave, a plurality of locking projections to be inserted into the dimples of the golf ball. The locking projections are positioned on the holding concave in correspondence to the position of each dimple. In this construction, the linear and horizontal movement of the rotary shaft can be controlled according to the rotational angle of the upper and lower dies.

Preferably, the material of the cutting member is selected from a diamond file, sand paper, a metal file, and the like depending on the material of the cover of the golf ball.

According to the above construction, the golf ball is shaped by the upper and lower semipsherical molds each having dimple-forming projections at the connecting portions thereof so that dimples are formed on the seam. The burr formed on the seam is removed therefrom by the burr-removing apparatus.

That is, in the burr-removing apparatus, the fixing mechanism retaining the golf ball is rotated on the axis perpendicular to the plane including the seam and passing through the center of the golf ball so as to press the cutting member installed at the leading end of the rotary shaft against the seam. The rotary shaft of the cutting mechanism moves forward when the cutting member is brought into contact with the dimple while it moves backward when the cutting member is brought into contact with the convex land. In this manner, the burr formed on the lands and the dimples of the seam can be successively removed from the seam.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
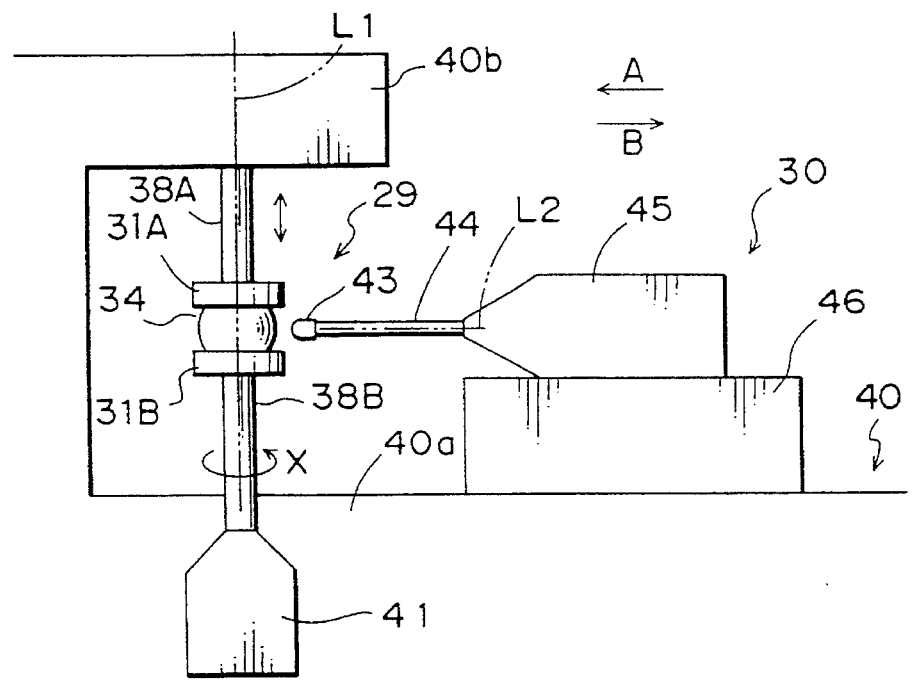
FIG. 1 is a schematic view showing an apparatus for manufacturing a golf ball according to one embodiment of the present invention.
Figure 2:
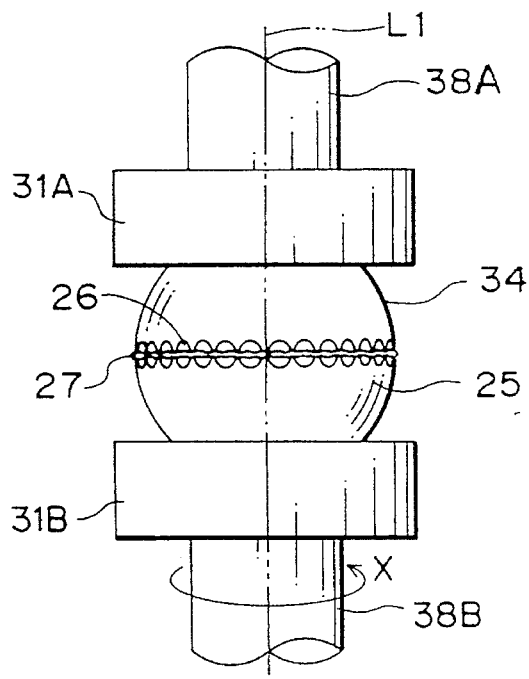
FIG. 2 is partial enlarged view showing a ball means.

Before the description of the present invention proceeds, it is to be noted that like parts are designated by like reference numerals throughout the accompanying drawings.

An apparatus for manufacturing a golf ball according to an embodiment of the present invention will be described below with reference to FIGS. 1 through 11.

Figure 6:
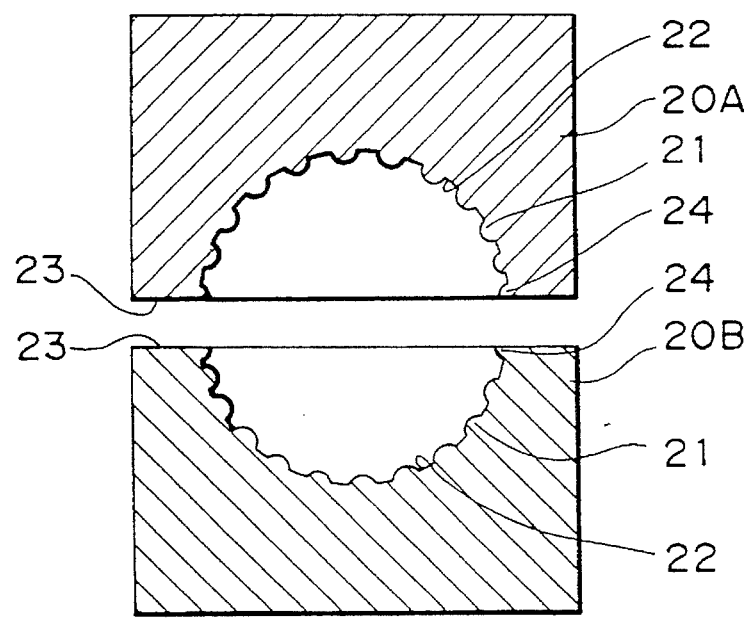
FIG. 6 is a sectional view schematically showing a pair of semispherical molds for shaping the cover of a golf ball from which a burr is removed by the apparatus shown in FIG. 1.

FIG. 1 through 5 show an apparatus for removing a burr from the seam of a golf ball shaped by a pair of semispherical molds 20A and 20B shown in FIG. 6.

With reference to FIG. 6, concave surface 22 having dimple-forming projections 21 is formed on each of the molds 20A and 20B. A portion of each concave surface 22 corresponding to a connecting portion 23 of each has a plurality of half-projections 24 formed by bisecting radially the projection 21. The half-projections 24 when opposed to each other form dimple-forming projections as the connecting portions 23 of the molds 20A and 20B are superimposed on each other.

When the connecting portions 23 of the molds 20A and 20B are superimposed on each other, the concave surfaces 22 of the molds 20A and 20B form a cavity. A golf ball is configured by pressure molding or injection molding of resin put into the cavity.

Figure 7:
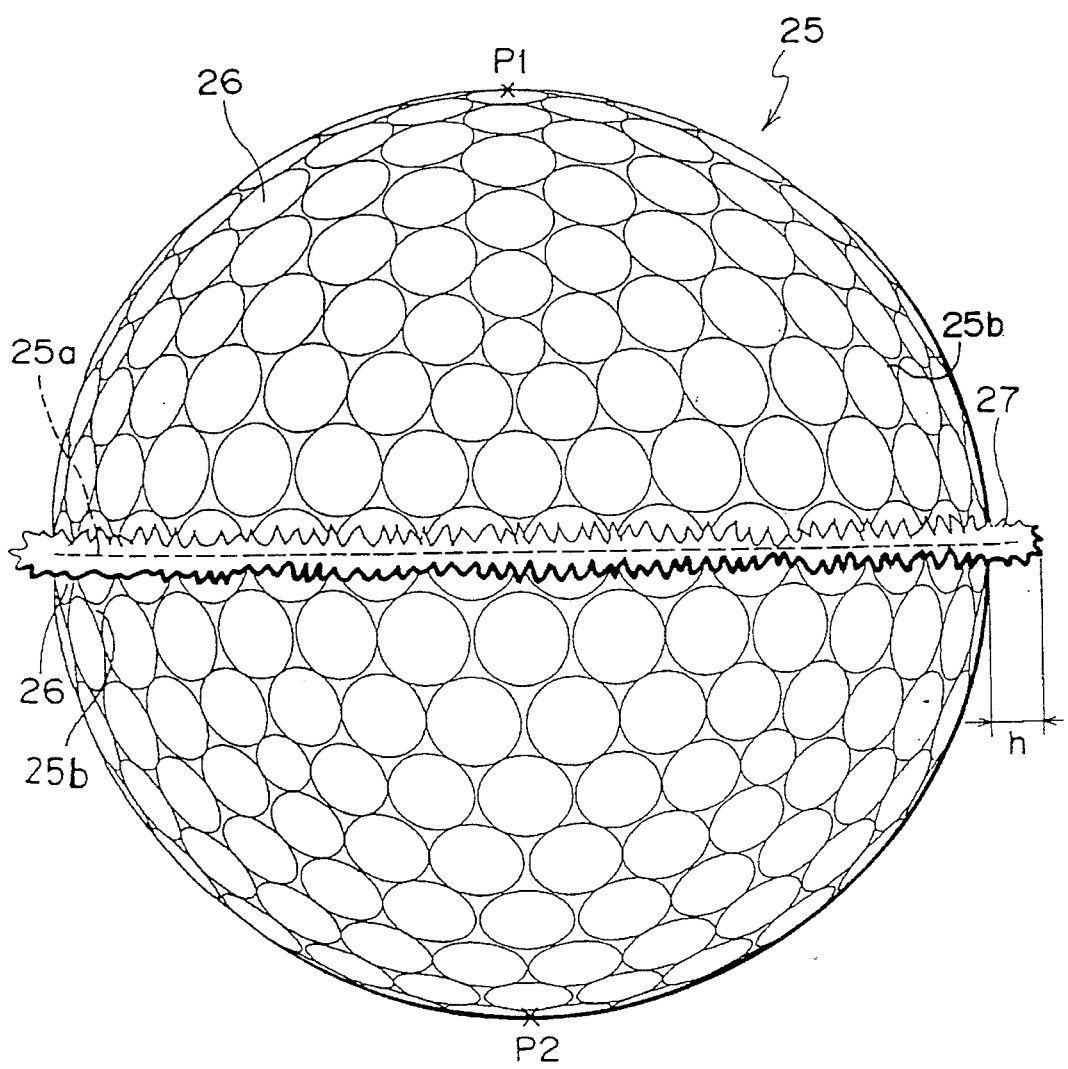
FIG. 7 is a front view showing a state in which the cover of the golf ball is shaped by the mold shown in FIG. 6.
Figure 8:
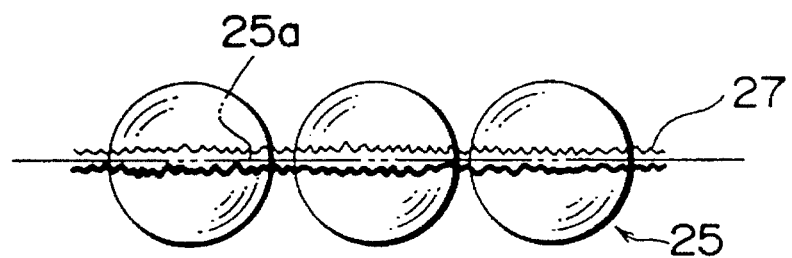
FIGS. 8A and 8B are schematic views showing the relationship between dimples and a burr.
Figure 8:
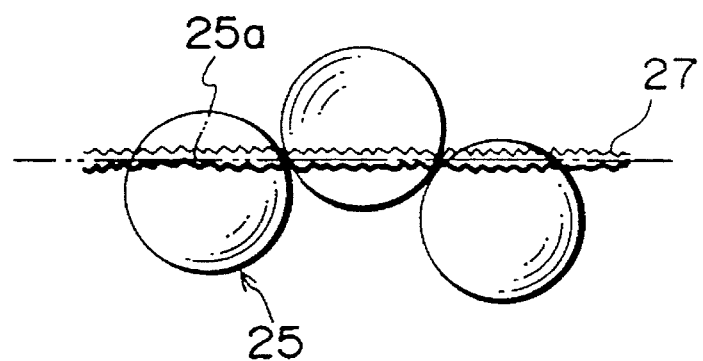

As shown in FIG. 7, in a golf ball 25 shaped by using the molds 20A and 20B, a burr 27 as well as dimples 26 are formed on a seam 25a corresponding to the connecting portions 23 of the molds 20A and 20B. The height (h) of the burr 27 is normally 0.1 mm–2.0 mm. Not only the dimples 26, but also portions on which the dimples 26 are not formed, namely, lands 25b are formed on the seam 25a of the golf ball 25. Thus, the seam 25a is irregular with concave and convex portions.

The apparatus for removing the burr 27 from the seam 25a as shown in FIGS. 1 through 5 includes a ball fixing mechanism 29 and a cutting member 30.

The ball fixing mechanism 29 includes an upper die 31A and a lower die 31B for holding the golf ball 25.

Figure 3A:
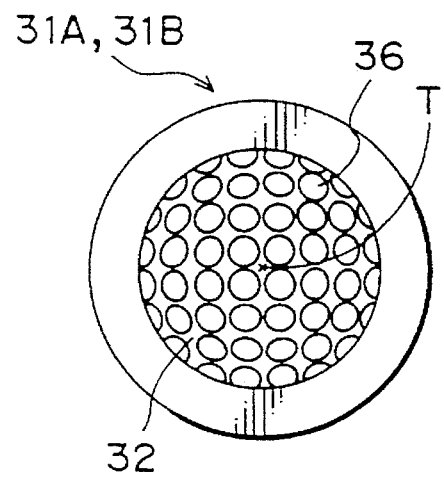
FIG. 3A is a bottom view showing upper and lower molds.
Figure 3B:
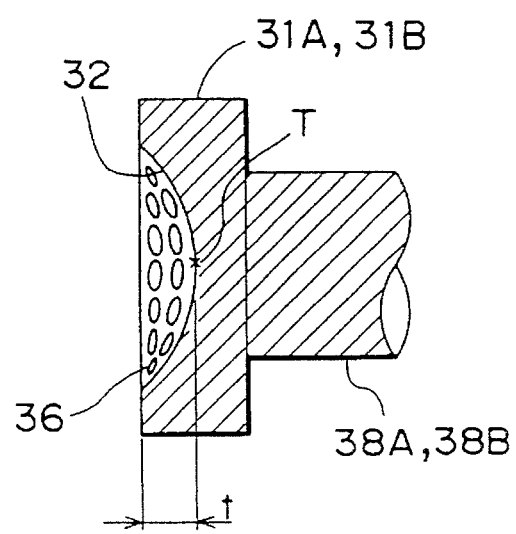
FIG. 3B is a sectional view showing the upper and lower molds of FIG. 3A.

As shown in FIGS. 3(A) and 3(B), the upper and lower dies 31A and 31B have a holding concave 32, having a radius of curvature almost equal to that of the golf ball 25, on the inner surface thereof. The depth (t) of the holding concave 32 is set to be smaller than the radius of the golf ball 25. When the golf ball 25 is sandwiched between the dies 31A and the 31B, the circular arc of the golf ball 25 is exposed in a gap 34 between the dies 31A and 31B.

There are formed, on the holding concave 32, a plurality of locking projections 36 to be inserted into the dimples 26 of the golf ball 25. The locking projections 36 are positioned on the holding concave 32 in correspondence with the position of each of the dimples 26 on the golf ball 25 as it is held between the upper and lower dies 31A and 31B with the poles P1 and P2 of the golf ball 25 coinciding with the vertex T of each of the holding concaves 32.

In this embodiment, because the locking projections 36 are formed on the holding concave 32 in such an arrangement as described above, the seam 25a is exposed in the gap 34 when the upper and lower portions of the golf ball 25 are covered with each of the upper and lower dies 31A and 31B.

The upper die 31A and the lower die 31B are connected with each of rotary shafts 38A and 38B having an axis connecting the vertexes T of the holding concaves 32 of the upper and lower dies 31A and 31B, namely, a rotary axis L1 coaxial with a line connecting the poles P1 and P2 of the golf ball 25.

The shaft 38A connected with the upper die 31A is rotatably supported by a supporting portion 40b of the upper portion of a frame 40. The shaft 38A is slidably movable upward and downward by a driving mechanism (not shown) disposed inside the supporting portion 40b. The shaft 38B connected with the lower die 31B is rotatably supported by a base portion 40a and connected with a first driving mechanism 41, having a motor, at the lower end thereof. The first driving mechanism 41 rotates the shaft 38B.

A control apparatus (not shown) having a microcomputer controls the number of rotations of the first driving mechanism 41. For example, if the cover of the golf ball is made of a soft material such as balata, the number of rotations of the first driving mechanism 41 is set to 0.5–15 rpm, whereas if the cover of the golf ball is made of a hard material such as ionomer, the number of rotations of the first driving mechanism 41 is set to 0.1–5 rpm.

The cutting mechanism 30 includes a rotary shaft 44 having a cutting member 43, made of a grindstone, installed at an end of the rotary shaft 44. The rotary shaft 44 is connected with a second driving mechanism 45, having a motor, at the other end thereof. The second driving mechanism 45 rotates the rotary shaft 44 on an axis L2 perpendicular to the axis L1 of the ball fixing, mechanism 29. The second driving mechanism 45 is fixed to a moving mechanism 46 moving forward and backward on the base portion 40a as shown by arrows A and B along the axis L2. The height of the cutting mechanism 30 is set so that the cutting member 43 is brought into contact with the seam 25a of the golf ball 25 held by the upper and lower molds 31A and 31B of the ball fixing mechanism 29.

Figure 5:
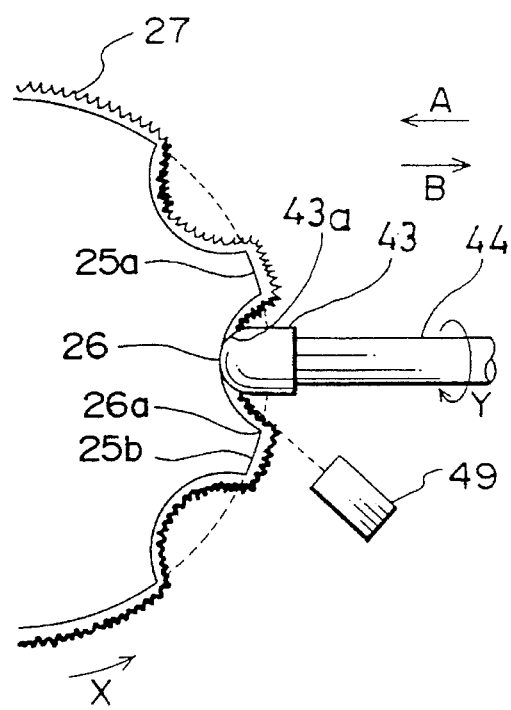
FIG. 5 is a schematic view showing the relationship between the cutting member and the golf ball.

As shown in FIG. 5 semispherical surface 43a is formed on the leading end of the cutting member 43. The radius of curvature of the semispherical surface 43a is set to be less than the sectional radius of curvature of each of the dimples 26. The term "sectional radius of curvature" means the radius of curvature of a circular arc formed by the intersection of a plane F1 perpendicular to the axis connecting the poles P1 and P2 and the curved surface including burr 27 of one of the dimples 26.

When the burr 27 passes through the center of the dimples 26, as shown in FIG. 8A, the sectional radius of curvature is the radius of curvature of one of the dimples 26, whereas when the burr 27 does not pass through the center of the dimples 26 as shown in FIG. 8B, the sectional radius of curvature is smaller than the radius of curvature thereof.

Normally, the radius of curvature of a dimple of a golf ball is 4.0 mm–25.0 mm. Therefore, the radius of curvature of the semispherical surface 43a of the cutting member 43 ranges from 0.5 mm to 22.0 mm. The reason the radius of curvature of the semispherical surface 43a is set in this range is as follows: If the radius of curvature of the semispherical surface 43a is set to be greater than the sectional radius of curvature, the cutting member 43 would cut the edge 26a of the dimple 26 while removing the burr 27.

The control mechanism (not shown) controls the number of rotations of the second driving mechanism 45 depending on the material of the cover of a golf ball and the material of the cutting member 43. For example, if the cover of the golf ball is made of a soft material such as balata, the number of rotations of the rotary shaft 44 is set to 500–6000 rpm, whereas if the cover of the golf ball is made of a hard material such as ionomer, the number of rotations of the rotary shaft 44 is set to 4000–30000 rpm.

Figure 4:
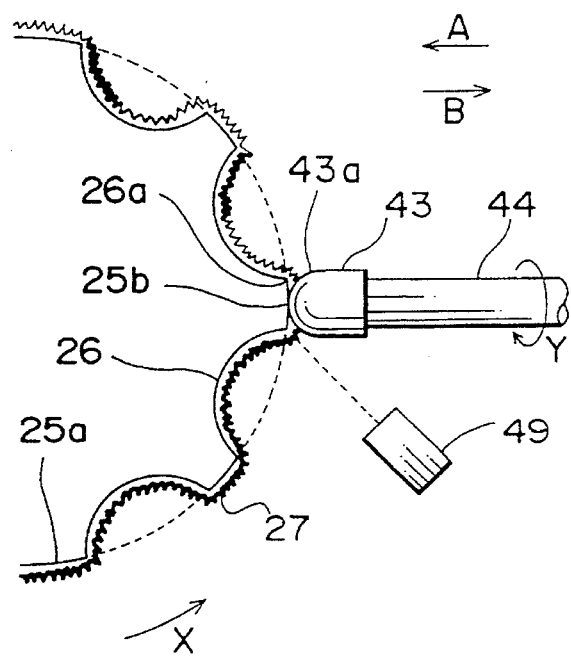
FIG. 4 is a schematic view showing the relationship between a cutting member and a golf ball.

The apparatus according to this embodiment includes a sensor 49 for detecting whether the cutting member 43 contacts the land 25b or one of the dimples 26 of the seam 25a as shown in FIGS. 4 and 5. The sensor 49 emits parallel beams to the upstream side in the rotational direction of the ball fixing mechanism 29 with respect to a point at which the cutting member 43 is in contact with the seam 25a. Based on light rays reflected by the seam 25a, whether the cutting member 43 contacts the land 25b or one of the dimples 26 can be detected. According to a result detected by the sensor 49, an instruction is outputted from the control mechanism connected with the sensor 49 so as to move the moving mechanism 46 backward or forward.

That is, when the cutting member 43 is brought into contact with the land 25b, the moving mechanism 46 is operated to cause the rotary shaft 44 to move backward as shown by arrow B, whereas when the cutting member 43 is brought into contact with one of the dimple 26, the moving mechanism 46 is operated to cause the rotary shaft 44 to move forward as shown by arrow A. In this manner, the cutting member 43 is pressed against the seam 25a with at a constant force regardless of whether the cutting member 43 is at the forward or backward position.

The operation of the apparatus for cutting the burr 27 off the seam 25a of the golf ball 25 shown in FIG. 7 is described below.

Initially, the golf ball 25 is set on the lower die 31B of the ball fixing mechanism 29 with the pole P2 of the golf ball 25 coinciding with the vertex T of the lower die 31B. Then, the rotary shaft 38A is moved downward, sandwiching the golf ball between the upper and lower dies 31A and 31B with the poles P1 and P2 coinciding with each of the vertexes T. At this time, the seam 25a is disposed in the gap 34 between the upper and lower dies 31A and 31B and positioned on a plane perpendicular to the axis L1 of the rotary shafts 38A and 38B.

Then, the first driving mechanism 41 is operated to rotate the upper and lower dies 31A and 31B in a direction shown by the arrow X (see FIG. 1). The second driving mechanism 45 is operated to rotate the rotary shaft 44 in a direction shown by the arrow Y (see FIGS. 4 and 5.)

Thereafter, the moving mechanism 46 moves forward as shown by the arrow A (see FIG. 1) to press the cutting member 43 installed on the leading end of the rotary shaft 44 against the seam 25a so as to start cutting the burr 27 off the seam 25a. The operation is undertaken with the sensor 49 operating for ensuring that the cutting member is properly positioned. Because the ball fixing mechanism 29 holding the golf ball 25 rotates, the dimples 26 and the lands 25b of the seam 25a are alternately brought into contact with the cutting member 43. In this manner, the burr 27 is removed from the seam 25a. The sensor 49 detects whether the cutting member 43 contacts one of the dimples 26 or the land 25b. When the cutting member 43 is brought into contact with the dimple 26, the rotary shaft 44 moves forward, whereas when the cutting member 43 is brought into contact with the land 25b, the rotary shaft 44 moves backward. In this manner, the cutting member 43 is pressed against the seam 25a at almost the same force throughout the cutting process for smoothly removing the burr 27 from the seam 25a.

Further, because the radius of curvature of the semispherical surface 43a disposed at the leading end of the cutting member 43 is set to be smaller than the sectional radius of curvature of each of the dimples 26, the cutting member 43 does not cut the edge 26a of each of the dimples 26. In this manner, only the burr 27 can be reliably cut off the seam 25a with the configuration of the dimple 26 maintained.

Figure 9:
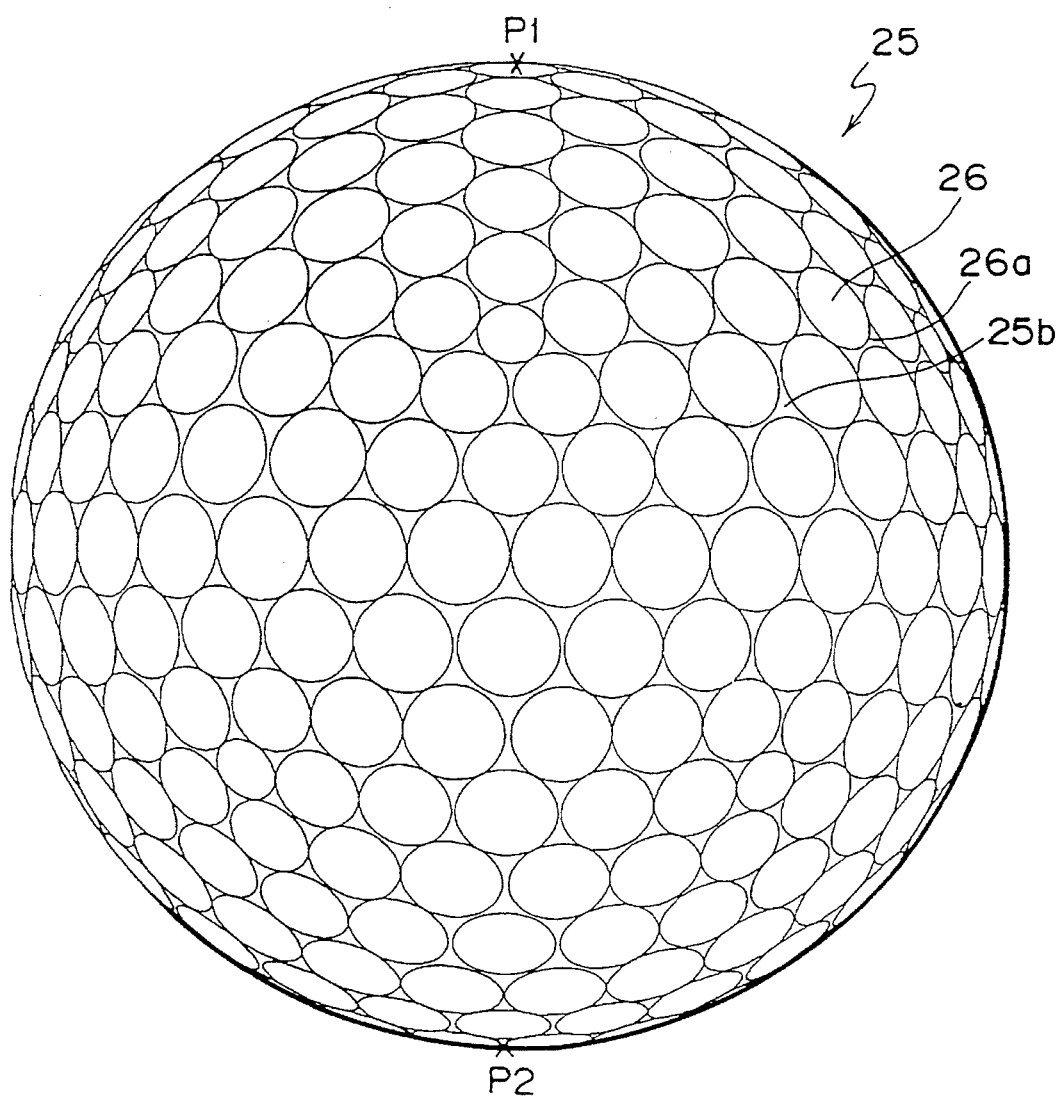
FIG. 9 is a front view showing a golf ball shaped by the apparatus shown in FIG. 1.
Figure 10:
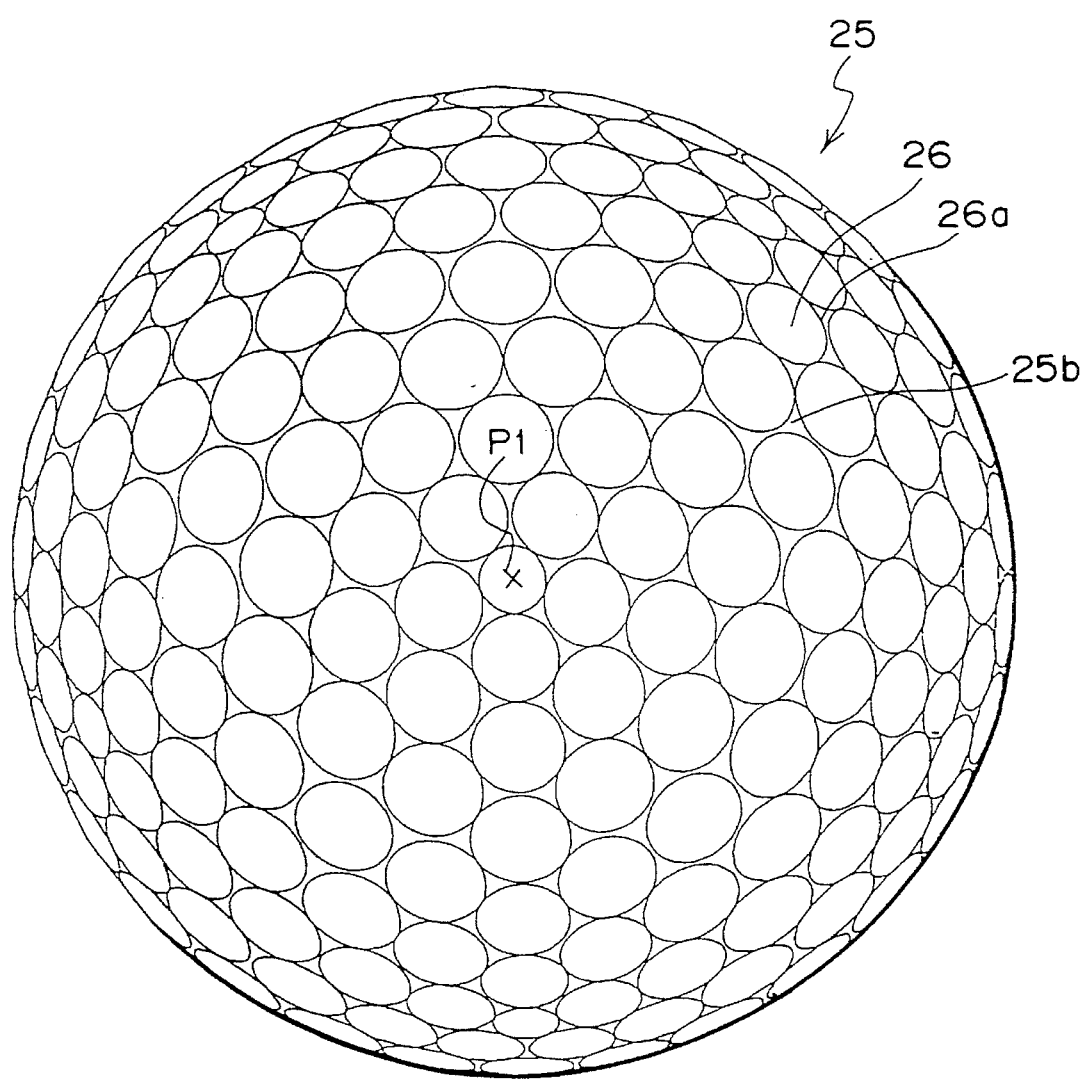
FIG. 10 is a plane view showing the golf ball shown in FIG. 9.
Figure 11:
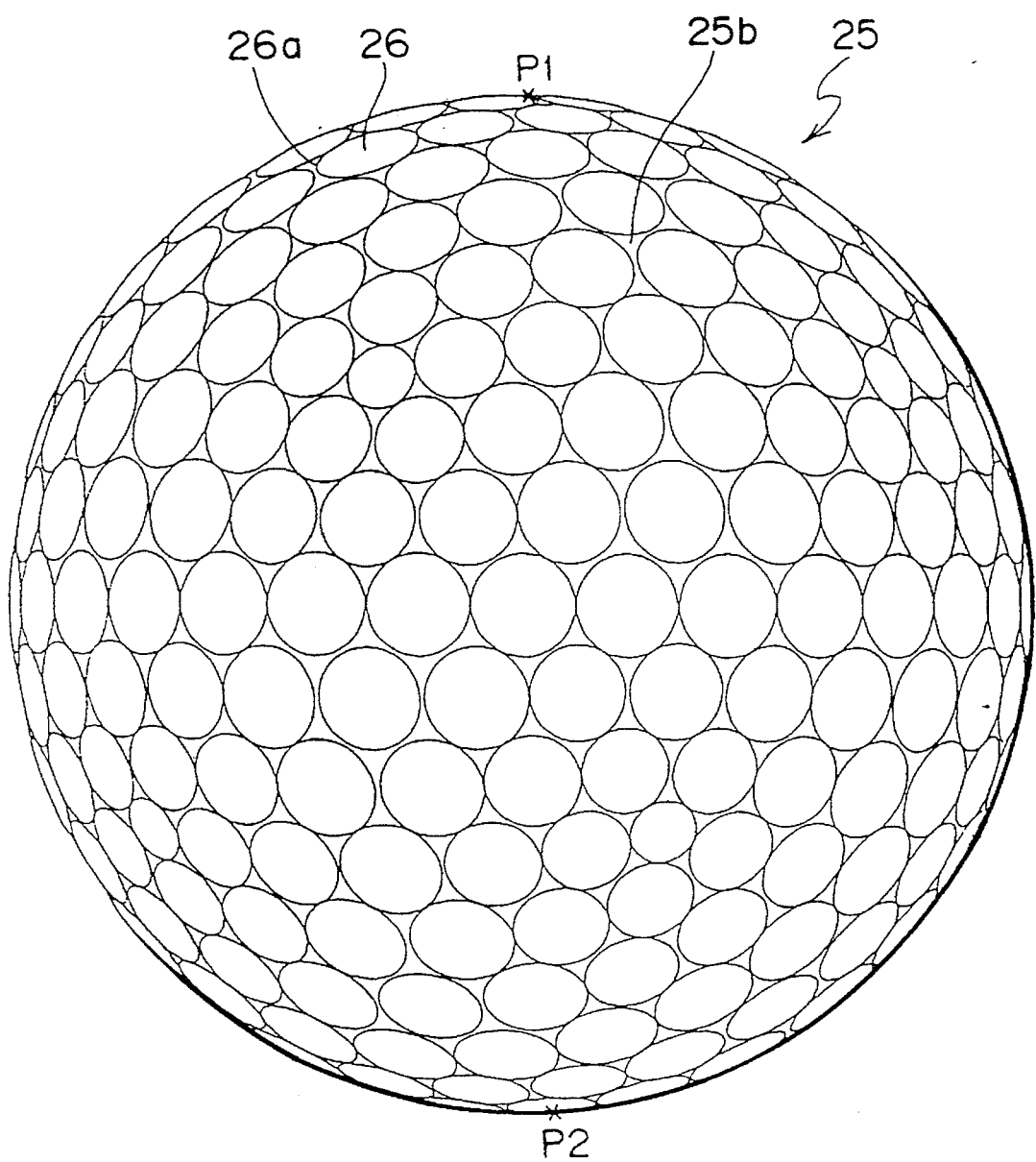
FIG. 11 is a right side view showing the golf ball shown in FIG. 9.
Figure 12:
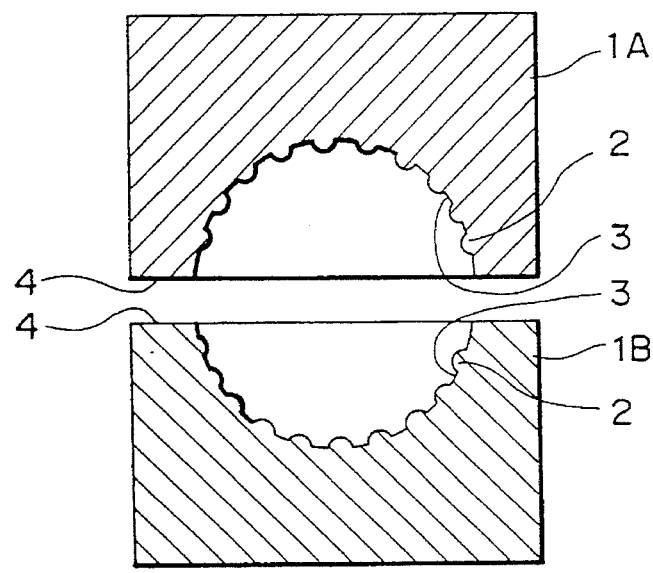
FIG. 12 is a sectional view schematically showing a pair of conventional semispherical molds to be used to shape the cover of a golf ball.
Figure 15:
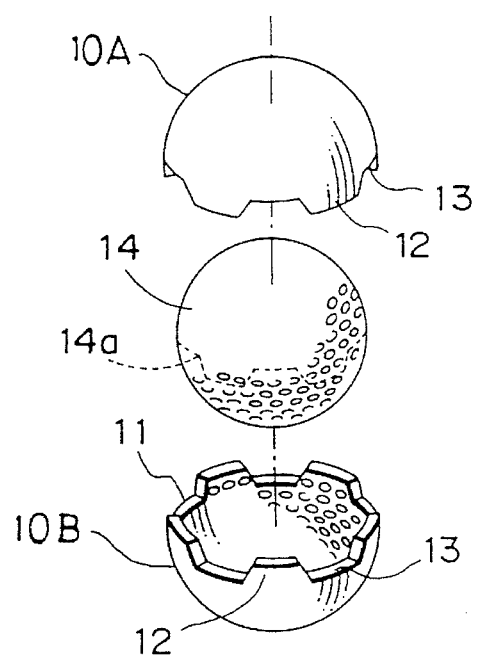
FIG. 15 is a schematic view showing an example of a conventional method for manufacturing a golf ball.
Figure 13:
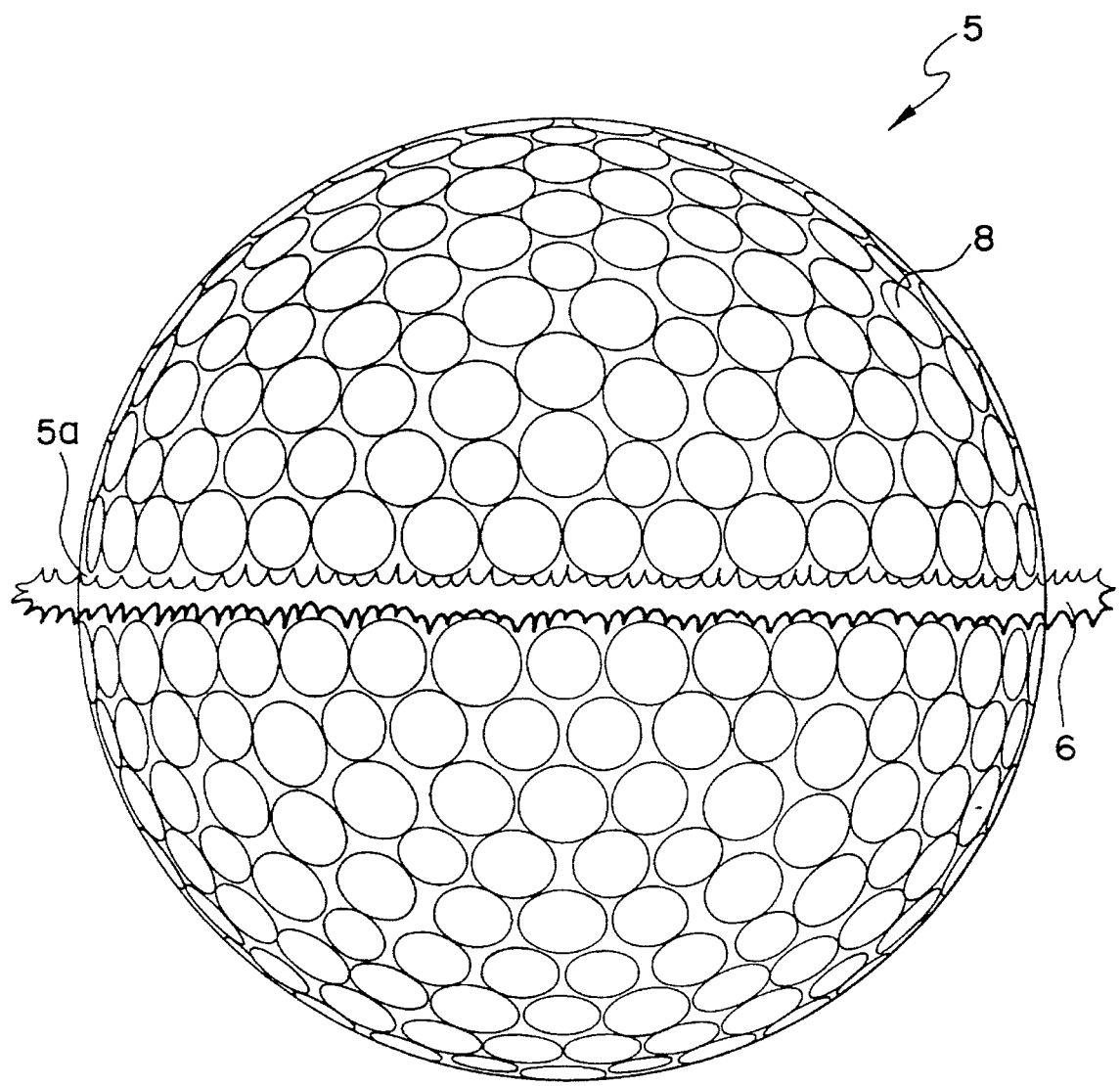
FIG. 13 is a front view showing a golf ball, the cover of which is shaped by the mold shown in FIG. 12.

As shown in FIGS. 9 through 11, the golf ball manufactured by the method according to the present invention does not have a great circle path and the burr is removed from the seam 25a so favorably that the naked eye cannot detect the position of the seam at a glance.

The present invention is not limited to this embodiment, but various modifications of the present invention are possible.

As described above, in this embodiment, the ball fixing mechanism 29 is rotated to allow the cutting member 43 to be pressed against the seam 25a, but the cutting mechanism 30 may be rotated around the golf ball 25 as retained by the fixing mechanism 29, on the axis perpendicular to a plane including the seam 25a and passing through the center of the golf ball 25.

The rotary shaft 44 may be slidable along the axis L2 and an elastic member, such as a helical spring is used to move the rotary shaft 44 forward as shown by the arrow A of FIG. 1. In this construction, it is unnecessary to provide the moving mechanism 46 and the sensor 49 and the cutting mechanism 30 can be fixed to the frame 40.

In the above-described construction, because the elastic mechanism contracts or expands according to whether the cutting member 43 is in contact with the dimple 26 or the land 25b of the seam 25a, the cutting member 43 smoothly contacts each of the dimples 26 or the land 25b. Therefore, it is unnecessary to control the position of the rotary shaft 44 along the axis L2.

It is possible to control the movement of the moving mechanism 46 along the axis L2 without using the sensor 49.

That is, when the locking projections 36 of the upper die 31A and/or that of the lower die 31B engage the dimples 26, i.e., when the cutting member 43 is in contact with one of the dimples 26 as shown in FIG. 5, a rotational angle to be made by the upper and lower molds 31A at which the cutting member 43 will be brought into contact with the land 25b adjacent to one of the dimples 26 can be apparent from the present rotational angle of the upper die 31A and/or that of the lower die 31B.

Accordingly, supposing that a portion of the seam 25a at which the cutting member 43 is in contact with the seam 25a is known, the cutting member 43 can be brought into contact with the seam 25a at a constant force by controlling the position of the rotary shaft 44 along the axis L2 according to the rotational position of the upper and lower molds 31A and 31B.

The material of the cutting member 43 may be selected from a diamond file, sand paper, a metal file, and the like depending on the material of the cover of the golf ball.

The ball fixing mechanism 29 may be replaced with an appropriate construction so long as it can reliably hold the golf ball with the seam 25a disposed in the gap 34.

Experiment

Figure 14:
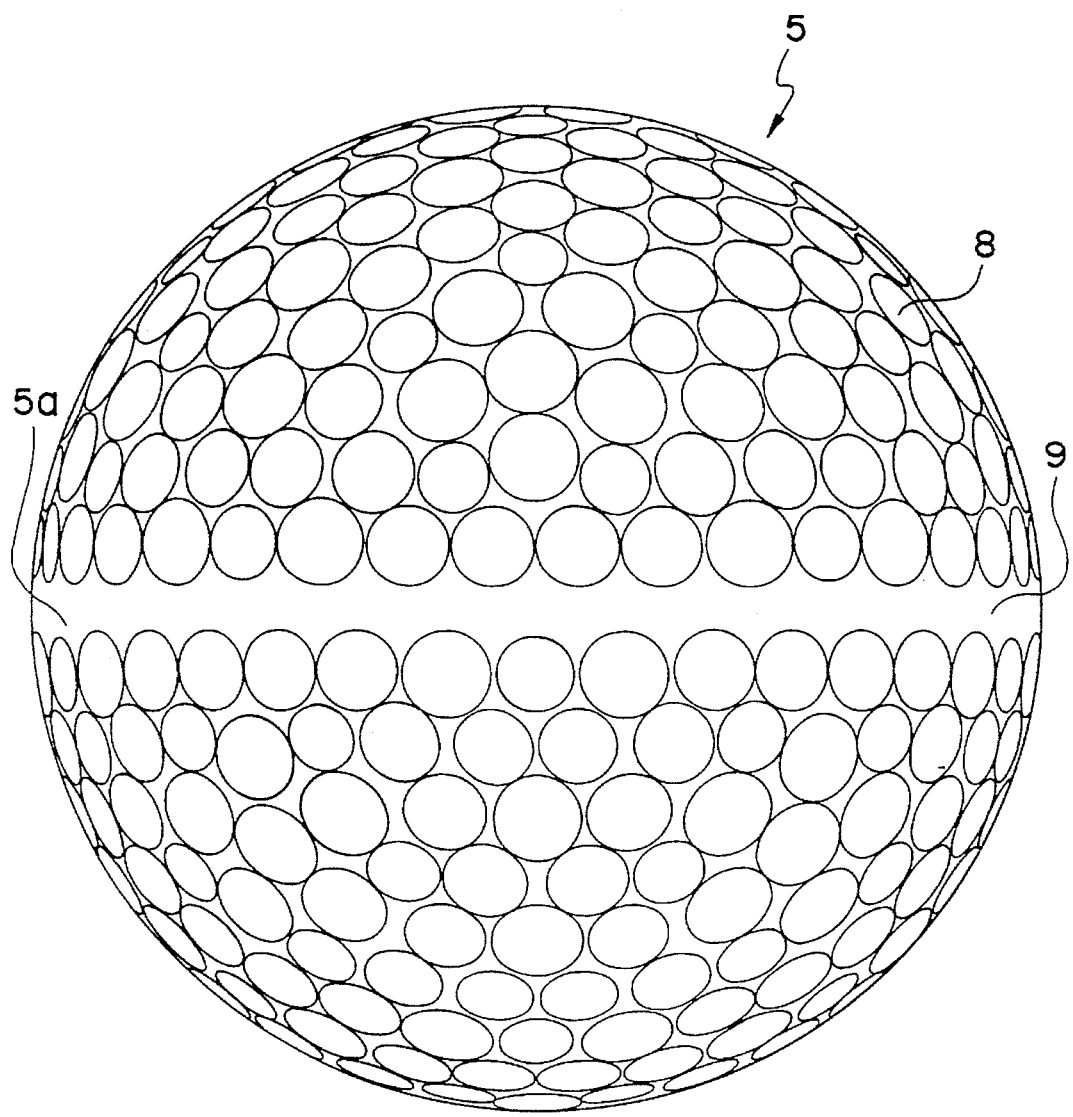
FIG. 14 is a front view showing a state in which a burr of the golf ball of FIG. 13 has been removed therefrom.

Flight tests of the following golf balls were conducted with the golf ball 25, shown in FIGS. 9 through 11, manufactured according to the method and apparatus of the present invention and the conventional golf ball 5, shown in FIG. 14, having the great circle path 9 formed on the seam 5a.

Each of the golf balls 25 (embodiment ball) and the conventional golf ball 5 (comparison ball) was hand-rolled and had a balata cover and a liquid center. Each ball had the same structure and material-mixing proportion. Each ball had an outer diameter 42.75 ±0.03 mm and compression of 90 ±2.

A swing robot (a driver (W1)) manufactured by True Temper Corp. was used to hit each ball at a head speed of 48.8 m/s.

The number of embodiment balls and comparison balls used was each 40. Of those 40 balls, 20 were seam-hit and 20 were pole-hit. Seam-hitting means a way of hitting a golf ball with the rotational axis of backspin in flight coinciding with a line connecting the poles P1 and P2 thereof, whereas pole-hitting means a way of hitting the golf ball with the rotational axis of backspin in flight coinciding with a line perpendicular to the poles P1 and P2 thereof.

Table 1 shows the average of carries and trajectory heights in the case of seam-hitting and pole-hitting. Carry means a distance between a hitting point and a fall point. Trajectory height means an angle of elevation between the line connecting the highest point in the trajectory of each ball and the hitting point and a horizontal line including the hitting point.

TABLE 1

|  | Way of hitting | Carry (yard) | Trajectory height (DEG) |
| --- | --- | --- | --- |
| Embodiment ball | seam-hitting | 242.1 | 13.77 |
|  | pole-hitting | 242.7 | 13.84 |
| Comparison ball | seam-hitting | 238.3 | 13.39 |
|  | pole-hitting | 240.5 | 13.75 |

As indicated in Table 1, the difference is seam-hitting and pole-hitting in carry and trajectory height in the comparison ball is much greater than the difference in seam-hitting and pole-hitting in carry and trajectory height in the golf ball according to the present invention. That is, the golf ball according to the present invention has a more favorable aerodynamic symmetricalness than the comparison ball.

As apparent from the foregoing description, in the apparatus according to the present invention, the golf ball is fixed to the ball fixing apparatus means with the seam uncovered with the upper and lower molds of the fixing mechanism and rotated on the axis perpendicular to the plane including the seam and passing through the center of the golf ball. Accordingly, the cutting member cuts the burr off the seam successively.

The cutting member is pressed against the seam by moving the rotary shaft forward when the cutting member is in contact with one of the dimples and backward when the cutting member is in contact with the land. Therefore, not only the burr formed on the land of the seam but also the burr formed on the dimple can be smoothly removed from the seam.

That is, the apparatus according to the present invention successively cuts the burr off the seam with efficiency, thereby mass-producing golf balls not having a great circle path.

Because the radius of curvature of the semispherical surface disposed at the leading end of the cutting member is set to be smaller than the sectional radius of curvature including the burr of the dimple, the cutting member does not cut the edge of the dimple. In this manner, only the burr can be reliably cut off the seam with the configuration of the dimple maintained. That is, the burr can be cut off the seam with a high accuracy.

The sensor detects whether the cutting member contacts a dimple or the land. The rotary shaft is moved forward or backward based on a result detected by the sensor. Therefore, the cutting member is pressed against the seam at almost the same force.

The construction in which the rotary shaft is urged toward the seam by the elastic mechanism eliminates the need for the provision of the sensor and thus reduces manufacturing cost.

Although the present invention has been fully described in connection with the preferred embodiments thereof with reference to the accompanying drawings, it is to be noted that various changes and modifications are apparent to those skilled in the art. Such changed and modifications are to be understood as included within the scope of the present invention as defined by the appended claims unless they depart therefrom.

What is claimed is:

1. An apparatus for removing a burr from a seam of a golf ball shaped by a pair of opposing molds, the seam having a plurality of dimples and lands disposed therein, comprising:

a ball fixing means for securely holding the golf ball; and a cutting means for removing the burr from the seam of the golf ball, the cutting means comprising a cutting member and a rotary shaft wherein, the cutting member being disposed at an end of the rotary shaft and having a radius of curvature smaller than a sectional radius of curvature of each of the dimples disposed on the seam and means for rotating the rotary shaft on an axis parallel to the seam of the golf ball to move the cutting member forward into contact with one of the plurality of dimples on the seam and backward to bring the cutting member in contact with one of the lands on the seam, whereby the cutting member is pressed successively against the seam of the golf ball retained by the ball fixing means for removing the burr while maintaining the integrity of the dimples and lands on the seam.

2. The apparatus as defined in claim 1 further comprising a sensor means for detecting whether the cutting member contacts one of the lands or one of the dimples of the seam when removing the burr from the seam of the golf ball for causing the driving means to move the cutting member backward when engaging one of said lands or forward when engaging one of said dimples.

3. The apparatus as defined in claim 1 wherein the rotary shaft comprises means for eleastically urging the rotary shaft forward.

4. The apparatus as defined in claim 3 wherein the urging means is a helical spring.

5. The apparatus as defined in claim 1 wherein the cutting means rotates around the golf ball as retained by the ball fixing means for traversely moving the cutting member along the seam when removing the burr from the golf ball.

6. The apparatus as defined in claim 1 wherein the ball fixing means comprises an upper die and a lower die for holding the golf ball therebetween while exposing the seam of the golf ball in a gap between the upper and lower dies.

7. The apparatus as defined in claim 6 wherein each of the upper and lower dies has a holding concave having a radius of curvature on an inner surface thereof which is equal to the outer radius of curvature of the golf ball.

8. The apparatus as defined in claim 7 wherein a plurality of locking projections are formed on the inner surface of each of the holding concaves and positioned to correspond to at least one of the plurality of dimples for securing holding the golf ball between the upper and lower dies.

9. The apparatus as defined in claim 6 wherein said ball fixing means further comprises a shaft for rotatably supporting each of the upper and lower dies.

10. An apparatus for removing a burr as recited in claim 1 wherein said ball fixing means rotates the golf ball with respect to the cutting means as the cutting member engaging the seam of the golf ball for removing the burr.

11. An apparatus for removing a burr as recited in claim 2 wherein said sensor means includes an optical sensor for detecting the position of the cutting member with respect to the seam of the golf ball for causing the rotating means to move the cutting member forward or backward while removing the burr from the seam of the golf ball.

* * * * *